May 5, 1964  J. H. MacLEOD, JR  3,131,512
UNDERFLOOR BLIND ELECTRICAL TERMINAL BOX
Filed March 21, 1962  2 Sheets-Sheet 1
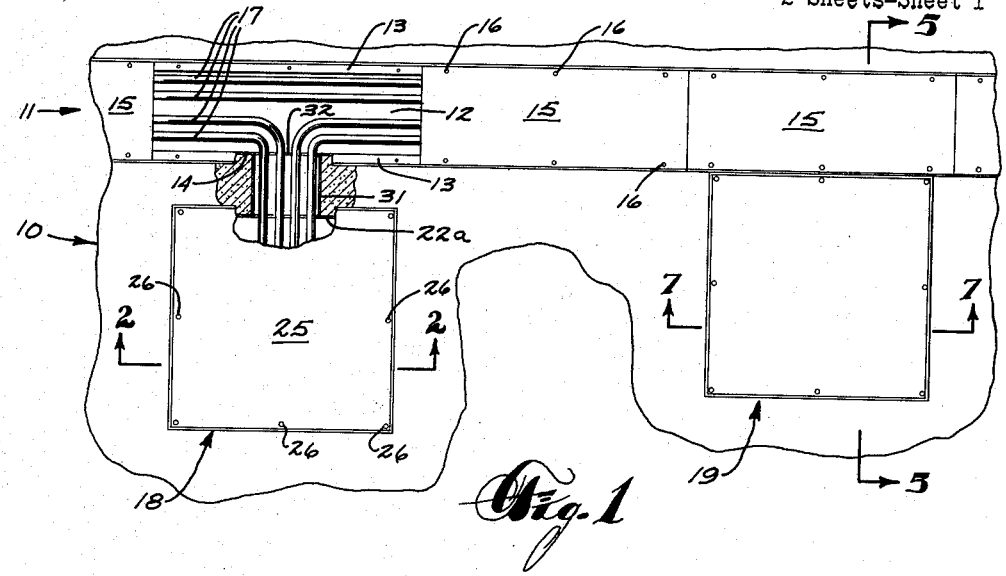
Fig. 1
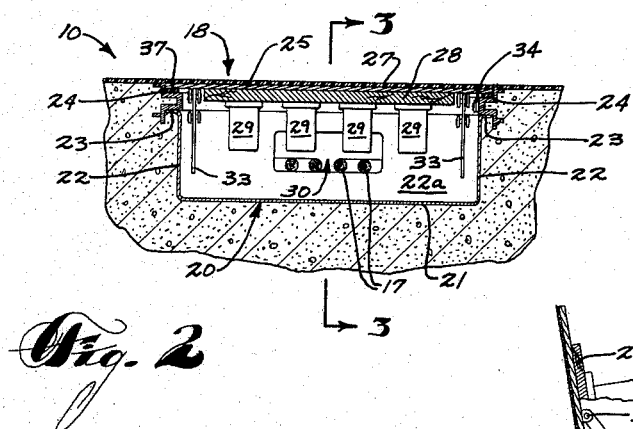
Fig. 2
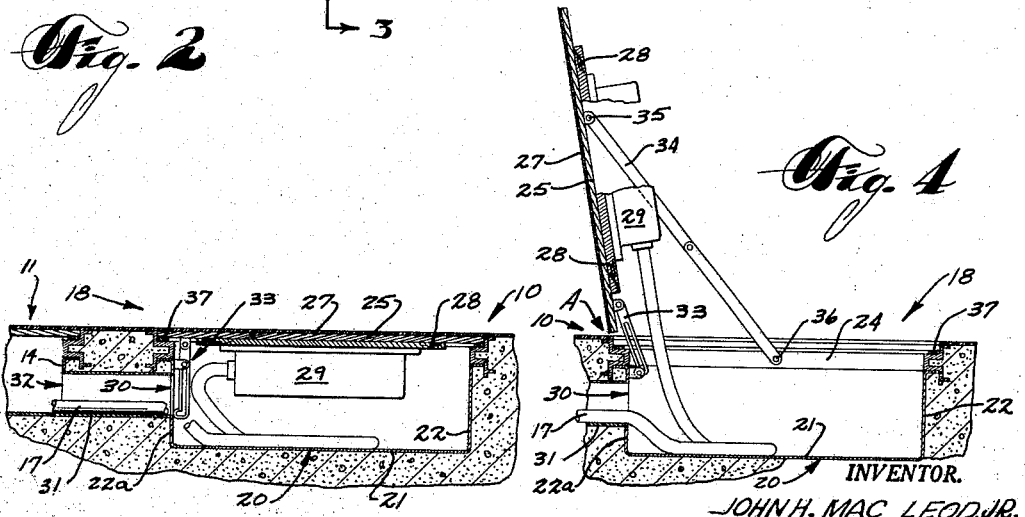
Fig. 3
Fig. 4
INVENTOR.
JOHN H. MAC LEOD, JR.
BY
Harry B. Keck
ATTORNEY May 5, 1964  J. H. MacLEOD, JR  3,131,512
UNDERFLOOR BLIND ELECTRICAL TERMINAL BOX
Filed March 21, 1962  2 Sheets-Sheet 2

INVENTOR.
JOHN H. MAC LEOD, JR.
BY
Harry B. Keck
ATTORNEY

" # United States Patent Office 3,131,512
Patented May 5, 1964

3,131,512
UNDERFLOOR BLIND ELECTRICAL
TERMINAL BOX
John H. MacLeod, Jr., Bellevue, Wash., assignor to
H. H. Robertson Company
Filed Mar. 21, 1962, Ser. No. 181,246
2 Claims. (Cl. 50—127)

This invention relates to an underfloor blind electrical terminal box and more particularly to a blind electrical terminal having a hinged coverplate which forms a part of a floor surface when closed and which presents electrical terminal blocks above the floor level when open.

The increasing complexity of telephonic and signal communications systems has necessitated the development of improved means for distributing multi-conductor electrical cables throughout buildings. The electrical trench has been utilized as an enclosed passageway for such cables. Such electrical trenches extend longitudinally throughout a building beneath the floor and usually in a corridor. A series of abutting coverplates encloses the open trench and serves as a portion of the floor. Electrical cables which extend through the trench may be distributed from the trench into transfer passageways in those floors which have cellular wire passageways.

For convenience, all of the intervening communications connections are usually provided in electrical terminal blocks from which the multi-conductor cables extend in various directions. Heretofore, these electrical terminal blocks have been provided in special wall mounted boxes, in utility rooms and utility closets of buildings.

According to the present invention, a blind terminal box for housing electrical terminal blocks can be provided beneath the level of a floor. Such underfloor electrical terminal boxes are especially desirable in buildings utilizing electrical trenches.

Heretofore, the electrical terminal blocks have not been located in building floors for various reasons:

(a) the possibility of water damage to the junction blocks and other apparatus has existed;

(b) there is a tendency for dirt and dust to accumulate in underfloor boxes;

(c) communications technicians have a general familiarity with electrical terminal blocks in a face-to-face vertical confrontation where they are normally encountered; the technicians might become confused in a different environment;

(d) there would be substantial inconvenience in working with electrical terminal blocks beneath a floor level.

The object of the present invention is to provide an underfloor blind terminal box having a hinged coverplate with electrical terminal blocks mounted on the underside of the coverplate for ready access to technicians.

A further object is to provide means for delivering multiple conductor cables to such boxes.

Another object is to provide such boxes adapted for use in combination with underfloor electrical trenches.

A still further object is to provide such boxes adapted for use with cellular flooring.

Yet another object is to provide a combination unit utilizing a segment of an electrical trench together with a blind terminal box.

These and other objects and advantages of the present invention will become apparent from the following detailed description by reference to the accompanying drawings in which:

FIGURE 1 is a fragmentary plan view of a portion of a building floor including an electrical trench and two alternative embodiments of the present blind terminal box;

FIGURE 2 is a cross-sectional view of one embodiment of the present invention taken along the line 2—2 of FIGURE 1;

FIGURE 3 is another cross-sectional view of one embodiment of the present invention taken along the line 3—3 of FIGURE 2;

FIGURE 4 is a cross-sectional view similar to FIGURE 3 showing the coverplate in an elevated position;

Figure 5:
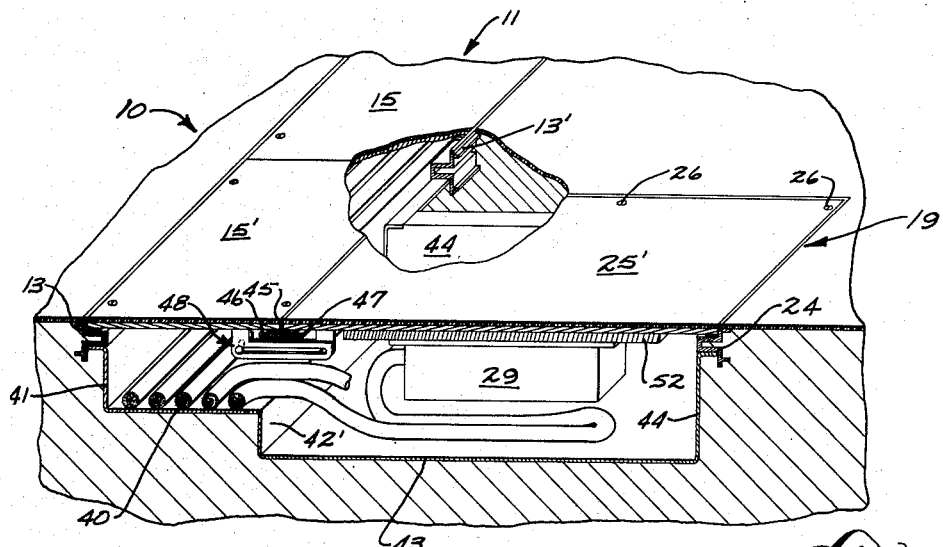
FIGURE 5 is a fragmentary perspective view, partly in cross-section, showing the alternative embodiment of the present invention taken along the line 5—5 of FIGURE 1.
Figure 6:
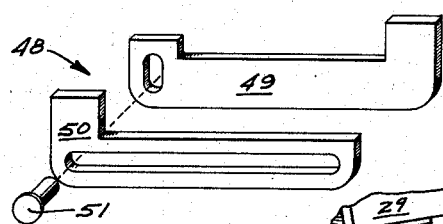
FIGURE 6 is a detailed perspective drawing of a hinge means utilized in the apparatus of FIGURE 5.

Referring to FIGURE 1 there is illustrated a building floor 10 having an electrical trench 11 preferably of the type described and illustrated in co-pending applications S.N. 7,722, filed February 9, 1960, now abandoned, S.N. 119,864, now U.S. Patent 3,084,480; and S.N. 119,977, filed June 27, 1961 and all assigned to the assignee of the present invention. The electrical trench 11 includes a U-shaped pan 12 having vertical side walls 14 and a flat bottom wall. A screed bar 13 is secured to the upper edge of each of the vertical side walls 14 whereby the screed bar 13 may be leveled with respect to the floor 10. Thereafter a plurality of generally rectangular coverplates 15 is bolted to the screed bars 13 by means of screws 16. The upper surface of the coverplates 15 forms a part of the floor 10. The interior of the trench 11 serves as a passageway for electrical cables 17.

Two embodiments of the present blind electrical terminal box are illustrated in FIGURE 1 and are identified generally by the numerals 18, 19.

Embodiment 18

That embodiment identified by the numeral 18 is illustrated in FIGURES 1 to 4 inclusive. The terminal outlet box 18 includes a box 20 having a flat bottom wall 21 and vertical side walls 22. A horizontal outward flange 23 is provided at the upper edge of each of the vertical side walls 22 to serve as a mounting means for adjustable screed bars 24. The adjustable screed bars 24 have an upper edge which is aligned with the level of the floor 10. The screed bars 24 preferably are formed by extrusion of aluminum. Such screed bars are more fully described in the aforementioned co-pending applications. A coverplate 25 rests along its edges on the screed bars 24 and is secured thereto by means of screws 26. The coverplate 25 preferably is formed from a sheet of steel plate and has on its upper surface a decorative floor covering 27 which may comprise linoleum, asphalt tiles, vinyl tiles and the like corresponding to the floor covering provided on the floor 10. A wooden sheet 28 is secured to the under surface of the coverplate 25 to serve as a mounting surface for a plurality of electrical terminal blocks 29.

A cable aperture 30 is provided in the side wall 22a of the box 20. A connecting sleeve 31 communicates with an aperture 32 in the side wall 14 of the electrical duct 11. A hinge means 33 is pivotally connected to the undersurface of the coverplate 27 and is slidably connected to the side wall 22a to allow pivotal elevation of the coverplate 27 above the level of the floor 10 as shown in FIGURE 4. An articulated connecting rod 34 is pivoted at one end to a bracket 35 secured to the coverplate 25 and at the other end to a stud 36 secured to one of the screed bars 24. The articulated connecting rod 34 limits the movement of the hinge means 33 and thereby supports the coverplate 25 in its elevated position.

It will be understood, of course, that in order to elevate the coverplate 25 it is necessary to remove the securing screws 26.

The hinge means 33 are so arranged that the coverplate 25 in its elevated position is spaced above the level of the floor 10 as indicated by the letter A in FIGURE 4. Hence, the floor covering adjacent to the hinge means 33 is not marred by the edge of the coverplate 25. It will be observed from inspection of FIGURE 4 that the electrical terminal blocks 29 are presented above the level of the floor 10 to permit ready access to the electrical junctions in face-to-face confrontation by a working technician.

It will be further observed by inspection of FIGURES 3 and 4 that the present terminal junction blocks 29 are elevated above the bottom 21 of the box 20 and are thereby protected against the deteriorating influences of any water, or accumulated dirt or debris which might enter into the interior of the box 20. As a further protection, a stripped gasket 37 is provided beneath the coverplate 25 and above the screed bars 24.

From inspection of FIGURES 1, 2, 3 and 4, it will be apparent that electrical cables 17 may be drawn from an electrical trench 11, through an under floor sleeve 31 into the interior of the present terminal box 18 whence all of the conductors of the cable 17 may be directly secured to terminals within the terminal junction blocks 29. Permanent connections between the terminals of the junction blocks 29 and conductors of the cable 17, can be readily completed by elevating the coverplate 25 as shown in FIGURE 4.

*Alternative Embodiment 19*

That alternative embodiment identified by the numeral 19 is illustrated in FIGURES 1, 5, 6, 7 and 8. The terminal outlet box 19 includes a T-shaped pan which serves in part as the pan element of the electrical trench 11, and also serves in part as the underfloor box portion of the electrical outlet box 19. The T-shaped pan element has a flat botom 40 corresponding to the bottom of the electrical trench 11 and a vertical side wall 41 to which a screed bar 13 is secured. Opposite the vertical side wall 41 is a vertical side wall 42 having a downwardly turned side wall portion 42', which extends to a bottom wall surface 43. On the other three sides, the bottom wall 43 joins vertical side walls 44 to which screed bars 24 are secured. Thus the interior of the electrical trench 11 and the interior of the present terminal box 19 are in open communication.

Figure 9:
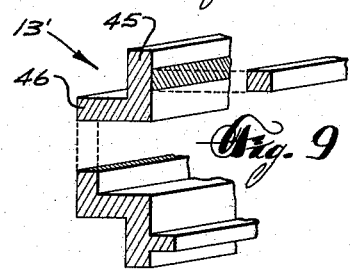
FIGURE 9 is a fragmentary perspective illustration of an underfloor screed bar of the type shown in U.S. Patent 3,084,480 which has been modified for the present purposes.

A junction screed bar 13' of the electrical trench 11 is in part cut away as shown in FIGURE 9 wherein only a vertical flange 45 and a horizontal flange 46 remain. The vertical flange 45 and the horizontal flange 46 extend continuously across the region of abutment between the electrical trench 11 and the electrical terminal box 19. An additional horizontal bar 47 is secured to the flanges 45, 46 to form a T bar between the coverplate 15' of the electrical trench 11 and the coverplate 25' of the electrical terminal box 19. Hinge means 48 are provided to permit the alternate elevation of either the coverplate 25' or the coverplate 15' as the need for access is presented.

The hinge means 48 include slotted brackets 49, 50 and a pintle 51 which may comprise a rivet, bolt and the like. The slotted bracket 49 is secured at one end to the undersurface of the coverplate 25'. Similarly, the slotted bracket 50 is secured at one end to the undersurface of the coverplate 15'. The pintle 51 extends through the slots of the two brackets 49, 50 and serves as a pivot point for the angular movement of either of coverplates 15', 25'.

Figure 8:
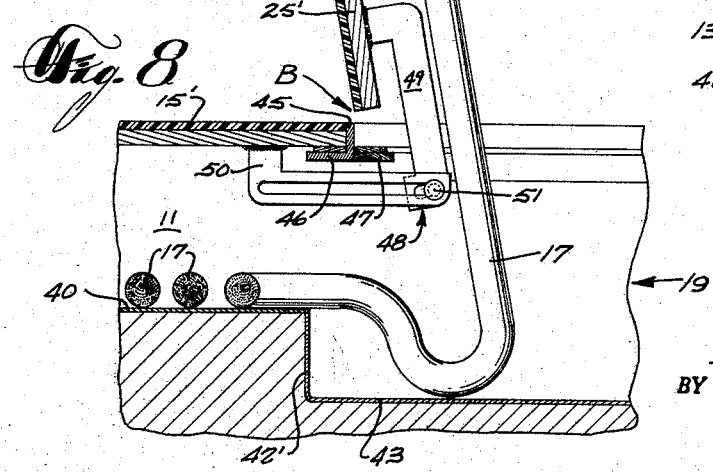
FIGURE 8 is a fragmentary cross-section view similar to a portion of FIGURE 5 showing the coverplate in an elevated position.

It will be observed, in FIGURE 8, that the coverplate 25', when elevated above the level of the floor, is spaced above the floor level as indicated by the arrow B. Hence, the floor covering on the coverplate 15' is not marred. Although not illustrated, the coverplate 15', when elevated above the floor, is also spaced above the floor level so that the floor covering on the coverplate 25' is not marred.

One or more sheets of wood 52 are secured to the undersurface of the coverplate 25' to serve as a mounting surface for a plurality of electrical terminal junction blocks 29.

Figure 7:
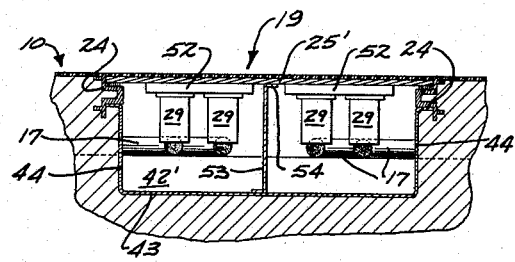
FIGURE 7 is a cross-section view of the electrical terminal box of FIGURES 1 and 5 taken along the line 7—7 of FIGURE 1.

In the embodiment of this invention indicated by the numeral 19, it is desirable to provide additional structural reinforcement to support the coverplate 25'. As shown in FIGURE 7, the additional structural reinforcement may comprise a Z bar 53 secured to the bottom 43 of the box 19 and providing an abutting flange 54 upon which the center of the coverplate 25' may rest. The Z bar 53 will not interfere with the movement of the coverplate 25' and the electrical junction blocks 29 which are secured thereto.

It should be apparent from the foregoing detailed description that the present invention provides an underfloor blind terminal box having a hinged coverplate with electrical terminal blocks mounted on the underside of the coverplate for ready access to technicians; means for delivering multiple conductor cables to such boxes; boxes adapted for use in combination with cellular flooring; and a combination unit utilizing a segment of an electrical trench together with a blind terminal box.

I claim:

1. In combination with an electrical trench comprising a continuous base element having a generally U-shaped cross-section including a flat bottom and generally vertical side walls, a pair of screed bars secured to the upper ends of said vertical side walls, a plurality of trench coverplates secured in abutment along their sides to the said screed bars, an improved blind junction box comprising:

a box-like housing disposed laterally of said trench in abutment with one of said side walls, said one of said side walls being cut away along a length corresponding to the length of said box-like housing to provide a communicating passageway between the interior of said trench and the interior of said housing, said box-like housing having a flat bottom and a first vertical side wall parallel to the said trench and second vertical side walls joining the ends of said first vertical side wall with said one of said side walls of said trench, a box coverplate for said box-like housing, box screed bars secured to the upper ends of said first and second vertical side walls, fastening means for securing said box coverplate to the said box screed bars, hinge means secured to the underside of said box coverplate and secured to the underside of said trench coverplate, spaced beneath the juncture thereof and beneath a juncture screed bar which is secured at its ends to said one of said side walls above the cut-away portion and above the said communicating passageway, said juncture screed bar providing between its ends a resting surface for the juncture edge of said trench coverplate and for the juncture edge of said box coverplate, whereby said box coverplate may be pivoted through said hinge means to provide access to the interior of said box-like housing independently of said trench coverplate and whereby said trench coverplate may be pivoted through said hinge means to provide access to the interior of said trench independently of said box coverplate.

2. The underfloor blind junction box of claim 1 wherein the said hinge means includes a movable pintle which elevates the said box coverplate entirely above the level of said floor surface during pivotal movement about the said pintle.

References Cited in the file of this patent

UNITED STATES PATENTS

| | | |
|---|---|---|
| 2,968,689 | Johnson | Jan. 17, 1961 |
| 3,070,252 | Reiland | Dec. 25, 1962 |

FOREIGN PATENTS

| | | |
|---|---|---|
| 199,980 | Switzerland | Dec. 1, 1938 |